United States Patent
Vakhovsky

(10) Patent No.: US 11,843,713 B2
(45) Date of Patent: Dec. 12, 2023

(54) SMART CALLER-ID

(71) Applicant: Skytell AG, Zug (CH)

(72) Inventor: Felix Vakhovsky, Miami, FL (US)

(73) Assignee: Skytell AG, Zug (CH)

( * ) Notice: Subject to any disclaimer, the term of this patent is extended or adjusted under 35 U.S.C. 154(b) by 233 days.

(21) Appl. No.: 17/412,429

(22) Filed: Aug. 26, 2021

(65) Prior Publication Data

US 2022/0070288 A1 Mar. 3, 2022

Related U.S. Application Data

(60) Provisional application No. 63/071,558, filed on Aug. 28, 2020.

(51) Int. Cl.
| | |
|---|---|
| H04M 1/57 | (2006.01) |
| H04W 4/14 | (2009.01) |
| H04W 8/26 | (2009.01) |
| H04L 51/58 | (2022.01) |

(52) U.S. Cl.
CPC ............ *H04M 1/576* (2013.01); *H04L 51/58* (2022.05); *H04W 4/14* (2013.01); *H04W 8/26* (2013.01)

(58) Field of Classification Search
CPC ........ H04L 51/48; H04L 51/58; H04M 1/575; H04M 1/576; H04W 4/14; H04W 8/26
See application file for complete search history.

(56) References Cited

U.S. PATENT DOCUMENTS

| | | | |
|---|---|---|---|
| 7,505,769 B2 | 3/2009 | Jiang | |
| 8,379,818 B2 | 2/2013 | Arsenault et al. | |
| 8,406,758 B2 | 3/2013 | Tagg et al. | |
| 9,008,654 B2 | 4/2015 | Sachanandani | |
| 9,508,242 B2 | 11/2016 | Podlisker | |
| 9,603,006 B2 | 3/2017 | Evans et al. | |
| 2005/0075106 A1 | 4/2005 | Jiang | |
| 2007/0105531 A1* | 5/2007 | Schroeder, Jr. ... | H04M 3/42229 455/433 |
| 2009/0274284 A1 | 11/2009 | Arsenault et al. | |
| 2015/0024739 A1* | 1/2015 | Bramwell ............... | H04W 8/04 455/432.3 |

* cited by examiner

*Primary Examiner* — Lester G Kincaid
*Assistant Examiner* — Dung L Lam
(74) *Attorney, Agent, or Firm* — Pablo Meles; GrayRobinson, P.A.

(57) ABSTRACT

An apparatus, system and method (500) is disclosed. The method includes receiving (501) an identification of a called party and an identification of a first user equipment (UE) device (102a) of a calling party for establishing a communication between the calling party and the called party. The method includes based on the identification of the first UE device of the calling party, receiving (502) a list including a plurality of MSISDNs. The method includes selecting (503), based on the identification of the called party, a MSISDN of the plurality of MSISDNs as a caller-id for displaying on a second UE device (102b) associated with the called party. The method can further include displaying (504) the selected MSISDNs.

19 Claims, 8 Drawing Sheets

SMART CALLER-ID

CROSS-REFERENCE TO RELATED APPLICATIONS

This application claims priority to U.S. Provisional Patent Application No. 63/071,558 entitled "Smart Caller-ID" filed Aug. 28, 2020, which is expressly incorporated herein by reference in its entirety to form part of the present disclosure.

TECHNICAL FIELD

The present disclosure generally relates to Smart Caller-ID systems. More particularly, but not exclusively, the present disclosure relates to apparatus, systems, and methods that enable the assignment or use of multiple mobile station international subscriber directory numbers (MSISDNs) for one Subcriber Identity Module (SIM), for one mobile device, or for multiple international mobile subscriber identities (IMSIs).

BACKGROUND

A mobile station international subscriber directory number (MSISDN) identifies a mobile device and is used as a caller identification number when a phone call is placed from the mobile device. When a user (calling party) wants to call another mobile device user (called party), the calling party dials an MSISDN of the called party.

A telecommunication network can process a call setup request from the calling party in order to place a call to the called party identified by the dialed MSISDN. To inform the called party of the identity of the calling party, the MSISDN of the calling party is displayed on the mobile device of the called party. The MSISDN corresponds with an international mobile subscriber identity (IMSI), which uniquely identifies a subscriber in the telecommunication network. The IMSI information is stored in a subscriber identity module (SIM) and does not change. The IMSI can be associated with a single MSISDN, and although this MSISDN can be changed, only one MSISDN can be associated with a mobile device using a single SIM card at a time. If more than one MSISDN number is desired for a single mobile device, a mobile device with a dual SIM card is required. With the dual SIM card based mobile device, two different MSISDNs can be assigned to the mobile device. However, no more than two MSISDNs can be assigned to the mobile device. Accordingly, a calling party identifier displayed on the called party's mobile device is limited to one of the two MSISDNs only.

A single MSISDNs can be sent in this manner via a voice communication network, an short messaging service (SMS) network, a multimedia message service (MMS) network, or almost any other wired or wireless network. SMS and MMS networks are similar, but an SMS network is only capable of sending text whereas an MMS network can send multimedia content such as pictures, video, and audio in addition to text. Using MMS does require additional network infrastructure to process the additional data resulting from transmitting pictures, video and audio and typically requires an internet connection whereas an SMS text message does not. Typically, the internet connection for an MMS message is provided through cellular data networks.

SMS messages are sent over wireless networks, using standard cellular data packets for example, but other wireless networks such as WiFi can be used as well. An SMS message is sent from the sender's phone to the nearest base station or hub. That message is then sent to the SMS message center, which passes the message to a recipient. SMS message delivery generally takes no additional allocation of channels and can still work on non-packet switched infrastructure. SMS will work on a large number of digital networks as well including GSM in Europe, PCS in the Americas, and PDC in Japan, WiFi networks among others. Implementing SMS on a GSM network for example may require just one additional server that would be coupled between mobile base stations.

MMS messages use some of this sending infrastructure. But the process is slightly more complex. When an MMS message is sent, the MMS message is submitted to a multimedia messaging service center (MMSC). The MMSC sends an SMS notification to the SMSC (Short Message Service Center), which notifies the recipient's device that there's an MMS message waiting on the MMSC. Lastly, the recipient's phone retrieves the MMS message from the MMSC. Again, the process of sending an MMS versus and SMS message is similar, but the MMS message uses more resources. Also, note that almost any mobile device can receive an SMS message whereas a more advanced mobile device (such as a smartphone) would be needed to present an MMS message to display an image or video to show a complete MMS message. Further note that many commuication devices utilize an API or an "Application Program Interface", which is a software intermediary that allows two applications to talk to each other.

With respect to MSISDNs, it is a technical term sometimes used for the mobile number attached to a SIM card in a mobile phone. An MSISDN contains several significant numbers to identify country, destination, and subscriber number. Depending on the country, the MSISDN can generally be broken down like this:

MSISDN=CC+NDC+SN, CC=Country Code, NDC=National Destination Code and SN=Subscriber Number.

In countries like the USA, an NDC is used to identify a specific region within the country, but some countries do not use an NDC. When sending SMS via SMPP, the number must be provided in full international format in order to deliver to the GSM network correctly. Many usability problems can surround this as a large proportion of mobile subscribers are not aware of specific country codes.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Back ground section should be treated as part of the inventor's approach to the particular problem, which, in and of itself, may also be inventive.

DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

The present disclosure provides multiple MSISDNs for a single user device without specialized hardware and dual SIM card approaches. Each MSISDN of the multiple MSISDNs may correspond to an IMSI. Accordingly, a single SIM card may be associated with multiple IMSIs, and may be allocated by a service provider. Thus, a single mobile device may have more than one MSISDN number and corresponding IMSI associated with a single SIM card or with a single mobile device. Each MSISDN of a plurality of MSISDNs associated with the mobile device and its SIM card may belong to a different geographic region, such as a country, or different areas of the country, etc. Thus, a device in such a system can display any MSISDNs related to a SIM across multiple networks.

When a calling party and a called party are associated with two different international MSISDNs, a call from the calling party to the called party is treated as an international call. A callback from the called party to the calling party is also an international call in that case because the called party is dialing a calling party identifier displayed on the called party's mobile device, and which is an international number as it has a different country code in the dialed digits than the MSISDN of the calling party.

In some embodiments, a call between the calling party and the called party in which the parties have different international MSISDNs may be handled as a local call, as described in more detail below. Accordingly, a callback from the called party to the calling may also be handled as a local call.

Various embodiments of this disclosure will be discussed with respect to the corresponding features.

Figure 1:
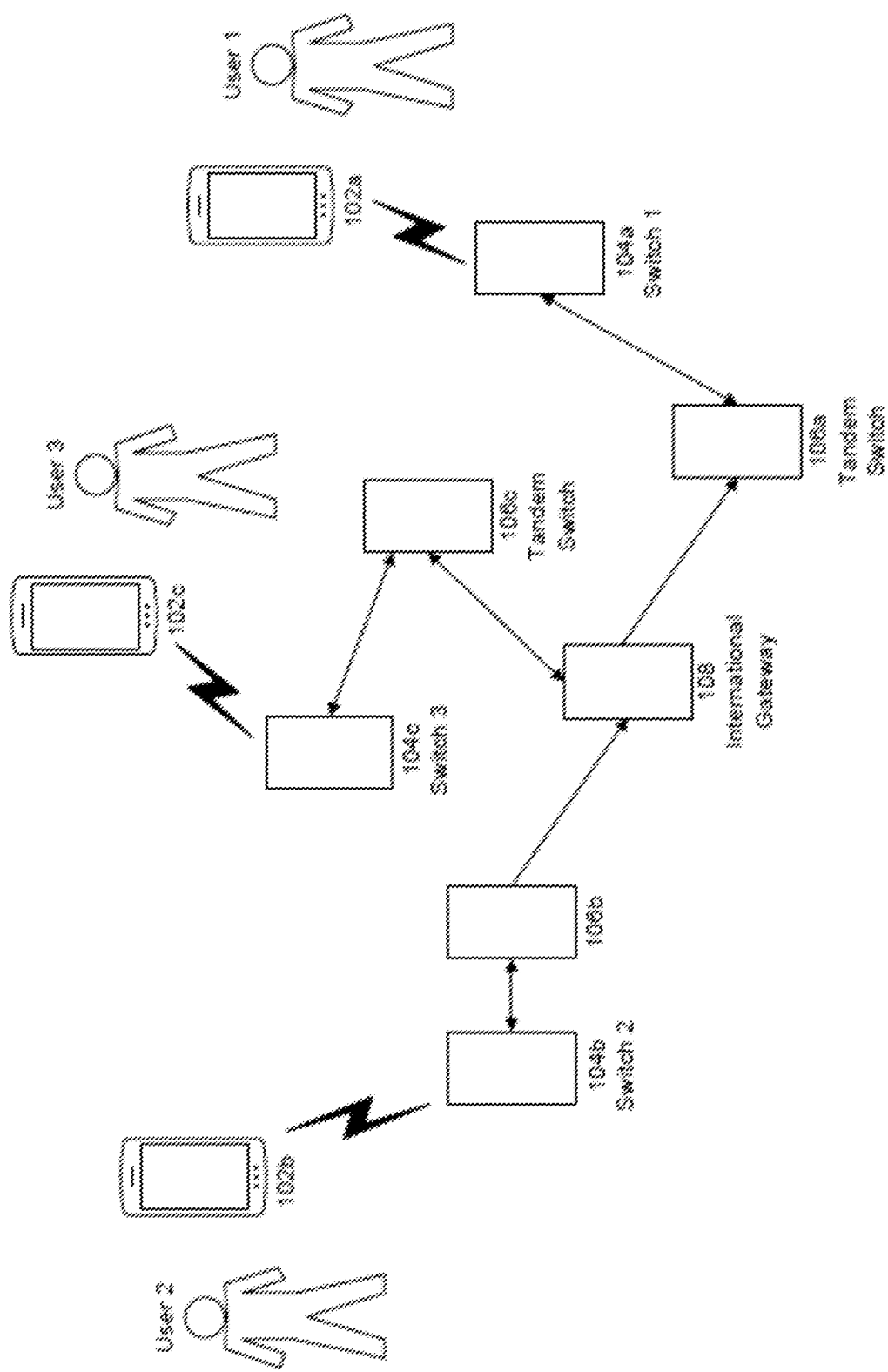
FIG. 1 illustrates a block diagram of an example network environment, according to some embodiments.

FIG. 1 illustrates a block diagram of an example network environment, according to some embodiments. As shown in FIG. 1, a first user user1 may possess a user equipment (UE) device 102a, such as a mobile phone, and correspondingly, a second user (user 2) may have UE device 102b and a third user (user3) may have UE device 103b. Each UE device of the UE devices 102a, 102b, and 102c has an international mobile subscriber identity (IMSI), which is stored in a subscriber identity module (SIM) card of each UE device. An IMSI number associated with a SIM card of a UE device 102a, 102b, and/or 102c each may be associated with a plurality of mobile station international subscriber directory numbers (MSISDNs). The MSISDN may generally be assigned based on where the UE device and/or the SIM card has been purchased. However, in accordance with some embodiments, a plurality of MSISDNs may be assigned to a single UE device and/or a single SIM card. Each MSISDN of the plurality of MSISDNs may be based on a different country and/or a different region of the same country where each may be operating on different networks. The user1 UE device 102a may be in a country A, for example, the USA. Similarly, a second user user2 UE device 102b may be in a country B, for example, India, and a third user user3 UE device 102c may be in a country C, for example, Singapore. Accordingly, the plurality of MSISDNs associated with the UE device 102a may each be an MSISDN corresponding to a different geographic region, such as a country (and in some instances, a different network as well). Similarly, the plurality of MSISDNs associated with the UE device 102b and the UE device 102c may each be an MSISDN corresponding to a different geographic region, such as a country (which may correspond to a different network).

Because the one or more IMSIs associated with a SIM card of the UE device corresponds to the plurality of MSISDNs, one of the plurality of MSISDNs may be used to identify and present a calling user's identity to a called party during a call. Similarly, the one of the plurality of MSISDNs may be used to identify a sender of a short message service (SMS) or similarly may be used to identify a sender of a multimedia message service (MMS).

By way of a non-limiting example, the plurality of MSISDNs associated with the IMSI may be mobile, fixed, non-geographic and any other type of telephone numbers of different countries. By way of a non-limiting example, the plurality of MSISDNs associated with the IMSI may be different mobile telephone numbers of a single country. For example, an IMSI of the UE device 102a of the user1 may be associated with a first MSISDN +1 XXX-XXX-XXXX, a second MSISDN +44 XXXXX XXXXX, a third MSISDN +91 XXXXX XXXXX, a forth MSISDN +61 XXXXX XXXXX, etc. as similarly shown in FIG. 2.

Some embodiments disclosed herein may provide automatic caller line identy (CLI) selection based on a B-number. The B-number refers to a called party number, which may be a person or device that answers a call. Thus, a calling party identifier may be selected based on the called party address digits. For example, while the user1 using UE device 102a would like to place a call to any phone subscriber also having MSISDN starting with YYY, the MSISDN of the plurality of MSISDNs associated with the SIM card of the calling party that also starts with YYY may be used as a caller-id while placing and presenting a call to the phone subscriber. Accordingly, calls from the user1 UE device 102a to any other phone subscribers having MSISDN starting with the same country code may be treated as local calls. However, a call from the user1 UE device 102a to a user UE device 102b having its MSISDN starting with a counrty code 91 may use the third MSISDN that also starts with a country code 91 as a calling party identifier. The third MSISDN that starts with the country code 91 may automatically be selected as the calling party identifier for the call based on the called party address digits.

In some embodiments, assuming that the user2 UE device 102b did not answer the call from the user1 UE device 102a, the user2 UE device 102b may callback the user1 UE device 102a using a calling party identifier displayed on the UE device 102b. Because the calling party identifier displayed on the UE device 102b and the MSISDN of the called party both starts with the same country code, when the user UE device 102b returns a call to the user1 UE device 102a, the call may be treated as a local call to the UE device 102a.

In some embodiments, if the user1 UE device 102a dials a new user having MSISDN starting with a country code +852 and none of the MSISDN of the plurality of MSISDNs associated with the SIM card of the calling user user1 UE device 102a starts with a country code +852, then a MSISDN that is non-local to the new user may be selected as the MSISDN for the calling party identifier of the calling user user1 UE device 102a. In this case, any MSISDN associated with the SIM card associated with the UE device 102a of the user1 may be used as the calling party identifier.

By way of a non-limiting example, the user may specify all or a subset of the plurality of MSISDNs as active MSISDNs. If the user1 UE device 102a dials a new user having MSISDN that starts with a country code +852 and none of the MSISDN of the plurality of MSISDNs associated with the SIM card of the calling user user1 UE device 102a starts with a country code +852, then any of the active MSISDN may be used as a calling party identifier of the calling user user1 UE device 102a. By way of a non-limiting example, a MSISDN used as a calling party identifier in the most recent call may be used as calling party identifier for a call to a called party number, where the calling party does not have any MSISDN that starts with a country code same as the country code of the called party.

In an embodiment, a calling party identifier for the purposes of short messaging service (SMS), texting from an SMS sender to an SMS receiver, can be selected in a similar manner to selection of an MSISDN based on a call by a calling party to a called party. Similarly, in some embodiments, In an embodiment, a calling party identifier for the purposes of multimedia messaging service (MMS), messaging (including text and/or media data) from an MMS sender to an MMS receiver, can be selected in a similar manner to selection of an MSISDN based on a call by a calling party to a called party.

Figure 2:
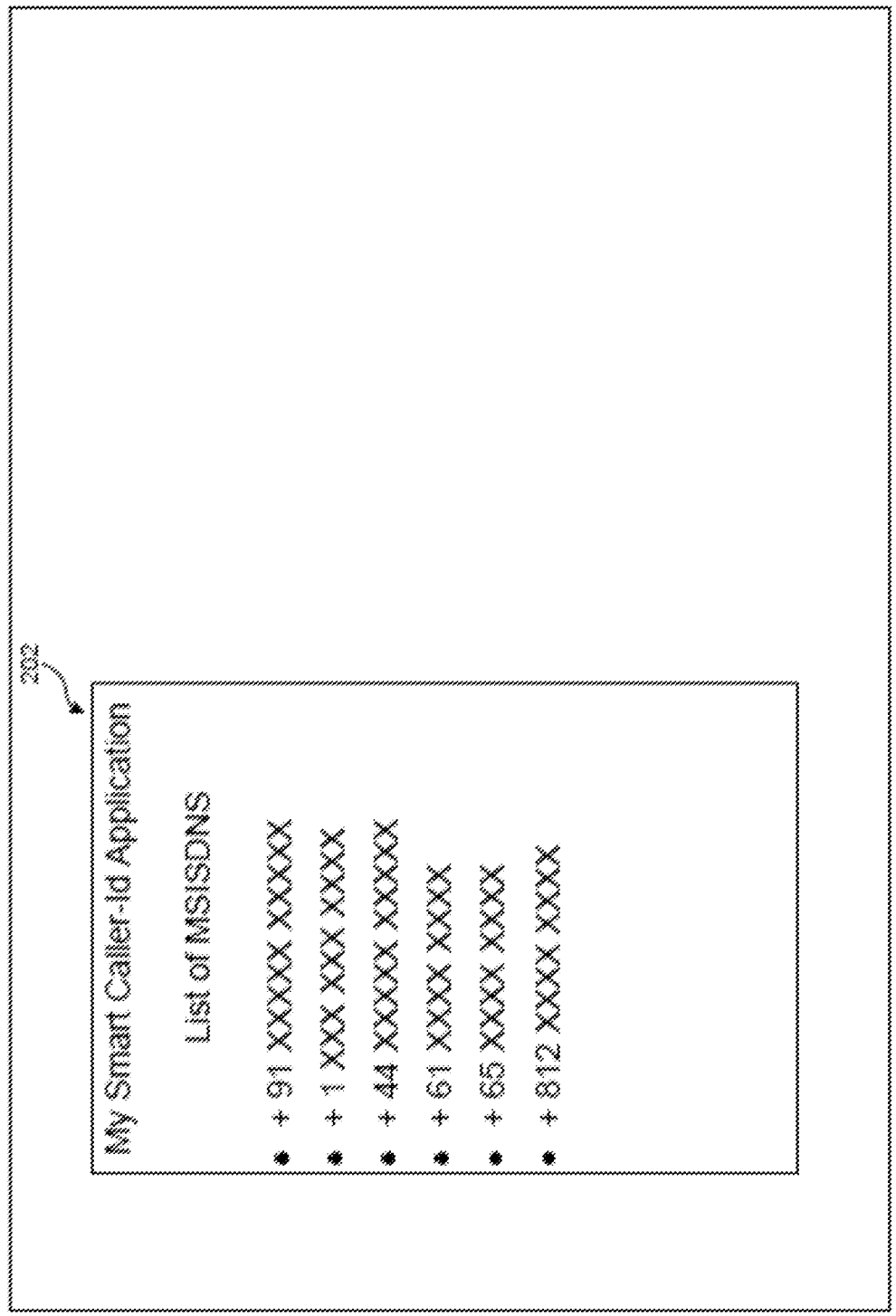
FIG. 2 illustrates a wireframe of a mobile application, according to some embodiments.

FIG. 2 illustrates a wireframe of a mobile application, according to some embodiments. A mobile application may be downloaded on the UE device 102a, which may include a SIM card that may support a plurality of MSISDNs, associated with one or more IMSIs. The plurality of MSISDNs may be stored in the SIM card and/or a memory associated with the mobile application. Upon launching of the mobile application by the user1 using UE device 102a, a wireless connection may be established between the mobile application and an application server. The application server may be located at the mobile switching center (MSC) in the core network. By way of a non-limiting example, the application server may be located in the radio access network (RAN).

The mobile application may build and send a message for authenticating the UE device 102a and retrieve a profile corresponding to the UE device 102a. The message for authentication of the UE device 102a may include an IMSI stored on the SIM card. The application server may build a response message including a list of the MSISDNs associated with the IMSI, and send the response message to the mobile application. The mobile application may parse the received response message and display the list of the MSISDNs to the user, as shown in FIG. 2 by a wireframe 202. By way of a non-limiting example, the user may designate active MSISDNs and inactive MSISDNs. The mobile application may store the list of the MSISDNs in the SIM card and/or the memory associated with the mobile application. The mobile application may also generate another message that includes the list of the MSISDNs to send to the application server. The application server may store the list of the MSISDNs in a database. The database may be a local database or a cloud-based database.

Figure 3:
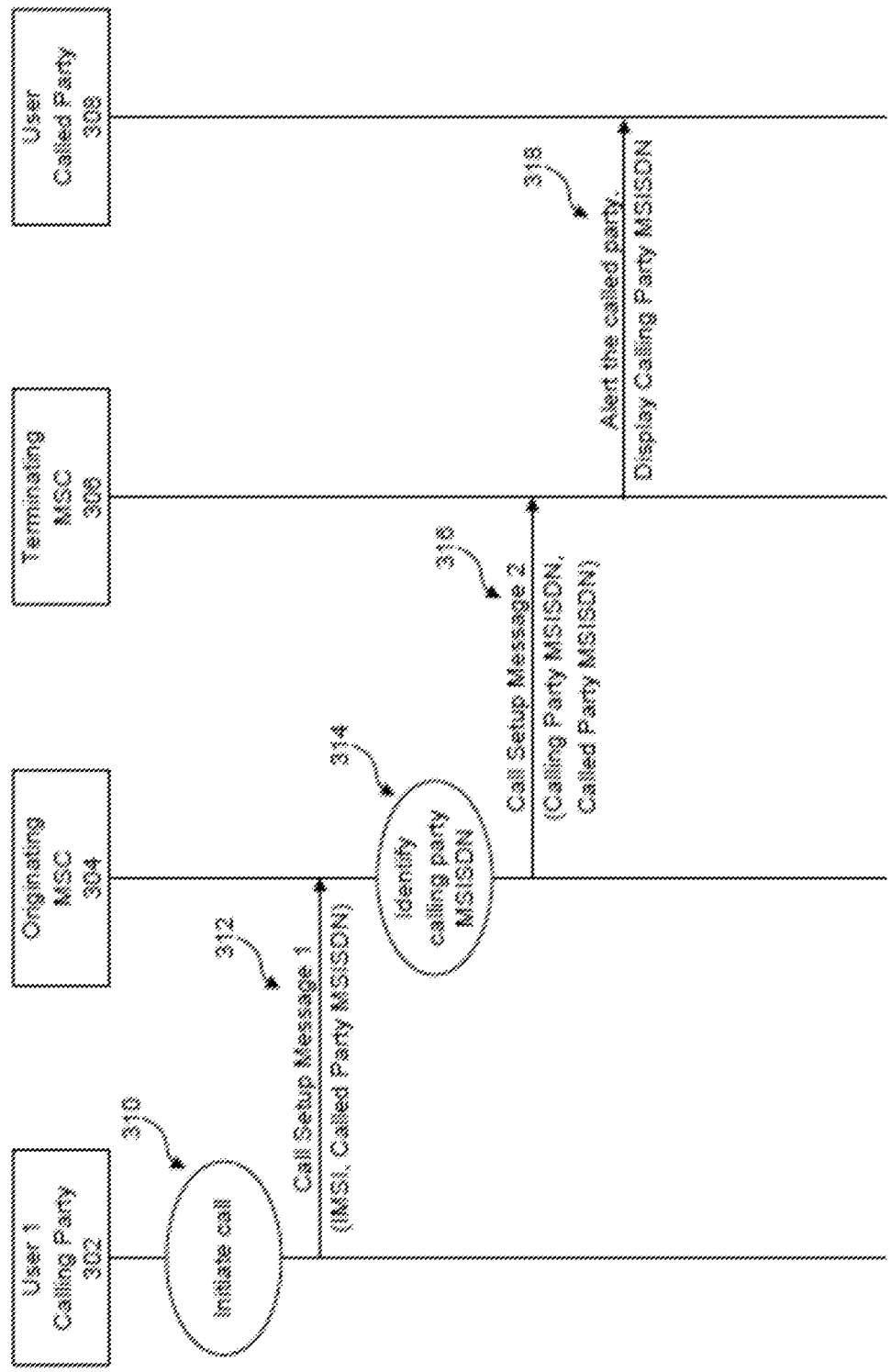
FIG. 3 illustrates a call flow diagram, according to some embodiments.

FIG. 3 illustrates a call flow diagram, according to some embodiments. FIG. 3 illustrates a flow of messages exchanged between a calling party 302, an originating MSC 304, a terminating MSC 306, and a called party 308. The calling party 302 may be the same as the user equipment device 102a, and the called party 308 may be the same as the user equipment device 102b. At 310, the calling party may initiate a call to the called party 308 by dialing an MSISDN of the called party 308. A call setup message-1 from the UE device 102a to the originating MSC 304 may include an MSISDN of the called party 308 and an IMSI of the UE device 102a.

At 314, upon receiving the call setup message-1 312 from the UE device 102a, the originating MSC may identify a calling party MSISDN to be used for the call to the called party 308. The originating MSC 304 may authenticate the calling party 304 based on the IMSI. By way of a non-limiting example, the authentication of the calling 304 may be performed using a billing and/or authorization server. Upon successful authentication that the calling party 302 is allowed to make a call using the UE device 102a, a list of MSISDNs may be retrieved by the originating MSC 304. Based on the the list of the MSISDNs stored at the HLR and/or the originating MSC 304, an MSISDN that starts with the same country code as the called party number may be selected as a calling party identifier.

The originating MSC 304 builds a call setup message-2 316 that includes the calling party MSISDN that is selected as described above, and the called party MSISDN, and sends the call setup message-2 316 to the terminating MSC 306. While only the originating MSC 304 and the terminating MSC 306 are shown in FIG. 3 for brevity, a person skilled in the art may understand that a call between the calling party and the called party may be processed by many intermediate switches and/or gateway before the call reaches the terminating MSC 306.

Upon receiving the call setup message-2 316 at the terminating MSC 306, the terminating MSC 306 may alert the called party 308 based on the status of the called party line, as shown in FIG. 3 by 318. By way of a non-limiting example, if the status of the called party 308 is determined to be busy, then the call from the calling party 302 may be directed to a voice mail system if the called party 308 has not subscribed to a call-waiting feature. If the status of the called party 308 is determined to be idle, then the call may be presented to the called party 308, as shown in FIG. 3 by 318, and the calling party MSISDN may be displayed on the UE device of the called party 308. As described above, the calling party MSISDN is selected such that the call between the calling party 302 and the called party 308 may be the local call.

By way of a non-limiting example, in a case when the called party 308 is unable to answer the call from the calling party 302, the called party 308 may decide to callback the calling party 302. The called party 308 may dial the calling party MSISDN that was displayed on the screen of the UE device of the called party 308. Accordingly, the callback from the called party 102b to the calling party 102a may be treated as a local call.

In the above discussion, selection of the MSISDN to use as a calling party identifier when a call from UE device 102a to the UE device 102b is done by a mobile switching center (MSC) or a core network. In some embodiments, the selection of the MSISDN to use as a calling party identifier may be performed by a UE device, such as the UE device 102a.

A table stored in the memory of the UE device may be accessed to identify a country and/or MSISDNs to determine which MSISDN should be used as the calling party identification. The MSISDNs in the table stored may be specified using an MSISDN pattern, which may show only a few starting digits of the MSISDN that may identify the country to which the MSISDN belongs to. By way of a non-limiting example, the UE may send a query message to an application server to determine the country and a starting digit pattern of the corresponding MSISDN. Accordingly, when the user 102a originates a call from the UE device 102a, a processor of the UE device 102a may execute AI-based call processing logic to determine the MSISDN to use as a calling line identifier from the plurality of MSISDNs. The AI-based call processing logic may select the MSISDN as the calling line identifier, which starts with the same country code as the called party address digits.

In some embodiments, the user of the UE device 102a may select the MSISDN to be used as a calling line identifier for each call originated from the UE device 102a. The phone application on the UE device 102a may be updated for the user to select the MSISDN to be used as a calling party identifier for the call. In some embodiments, the UE device 102a may have more than one MSISDN corresponding to the same country. For example, the UE device 102a may have one MSISDN as +1 703 XXX XXXX and another MSISDN as +1 727 XXX XXXX. Accordingly, the user may specify which MSISDN to be used as a calling line identifier when a US-based MSISDN is required for the call.

In some embodiments, the processor of the UE device 102a or the MSC/core network system may compare the dialed MSISDN with the incoming calls at the UE device 102a based on call history of the UE device 102a to determine the MSISDN of the UE device 102a at which a call may have been received at the UE device 102a from the dialed MSISDN. The call history of the UE device 102a may be parsed to determine if a call has been received from the dialed MSISDN. If a call has been received from the dialed MSISDN, then the MSISDN at which the call has been received may be used as a calling line identifier. If the dialed MSISDN does not match with any incoming call in the call history, then the any MSISDN may be used as the calling line identifier.

In some embodiments, analysis of the call history may be limited to a predetermined time duration, such as the last three months. In some embodiments, the UE device 102a may have more than one MSISDN corresponding to the same country. For example, the UE device 102a may have one MSISDN as +1 703 XXX XXXX and another MSISDN as +1 727 XXX XXXX. Accordingly, which MSISDN to be used as a calling line identifier may be selected based on an analysis of the call history of the UE device. If an incoming call from the dialed MSISDN has been received at +1 703 XXX XXXX number, then +1 703 XXX XXXX may be used as a calling line identifier. And, if no incoming call from the dialed MSISDN has been received earlier, then either the user-specified MSISDN or any of the +1 703 XXX XXXX and +1 727 XXX XXXX may be used as a calling line identifier.

Figure 4:
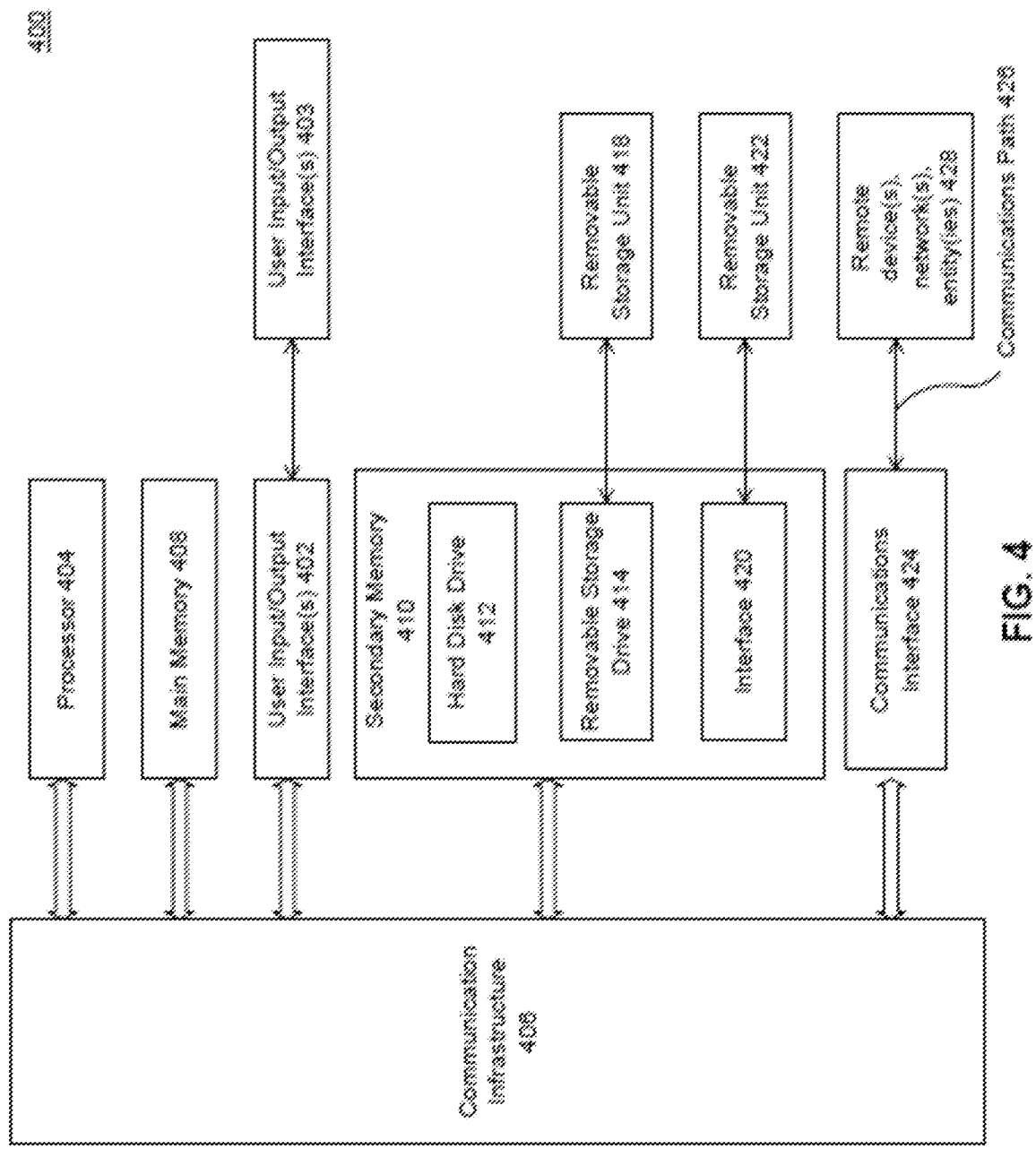
FIG. 4 illustrates an example computer system, according to some embodiments.

FIG. 4 illustrates an example computer system in accordance with some embodiments.

Various embodiments may be implemented, for example, using one or more well-known computer systems, such as a computer system 400, as shown in FIG. 4. One or more computer systems 400 may be used, for example, to implement any of the embodiments discussed herein, as well as combinations and sub-combinations thereof. The computer systems 400 may be used for the implementation of one or more embodiments described above.

The computer system 400 may include one or more processors (also called central processing units, or CPUs), such as a processor 404. The processor 404 may be connected to a communication infrastructure or bus 406.

The computer system 400 may also include user input/output device(s) 403, such as monitors, keyboards, pointing devices, etc., which may communicate with communication infrastructure 406 through user input/output interface(s) 402.

One or more processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 400 may also include a main or primary memory 408, such as random access memory (RAM). Main memory 408 may include one or more levels of cache. Main memory 308 may have stored therein control logic (i.e., computer software) and/or data.

The computer system 400 may also include one or more secondary storage devices or memory 410. The secondary memory 410 may include, for example, a hard disk drive 412 and/or a removable storage device or drive 414. The removable storage drive 414 may be a floppy disk drive, a magnetic tape drive, a compact disk drive, an optical storage device, tape backup device, and/or any other storage device or storage drive.

The removable storage drive 414 may interact with a removable storage unit 418. The removable storage unit 418 may include a computer-usable or readable storage device having stored thereon computer software (control logic) and/or data. The removable storage unit 418 may be a floppy disk, magnetic tape, compact disk, DVD, optical storage disk, and/any other computer data storage device. The removable storage drive 414 may read from and/or write to the removable storage unit 418.

The secondary memory 410 may include other means, devices, components, instrumentalities, or other approaches for allowing computer programs and/or other instructions and/or data to be accessed by the computer system 400. Such means, devices, components, instrumentalities, or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 400 may further include a communication or network interface 424. The communication interface 424 may enable the computer system 400 to communicate and interact with any combination of external devices, external networks, external entities, etc. (individually and collectively referenced by reference number 428). For example, the communication interface 424 may allow the computer system 400 to communicate with the external or remote devices 428 over communications path 426, which may be wired and/or wireless (or a combination thereof), and which may include any combination of LANs, WANs, Public Switched Telephone Network (PSTN), the Internet, etc. Control logic and/or data may be transmitted to and from the computer system 400 via the communication path 426.

The computer system 400 may also be any of a personal digital assistant (PDA), desktop workstation, laptop or notebook computer, netbook, tablet, smartphone, smartwatch or another wearable, appliance, part of the Internet-of-Things, and/or embedded system, to name a few non-limiting examples, or any combination thereof.

The computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In accordance with some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, the computer system 400, the main memory 408, the secondary memory 410, and the removable storage units 418 and 422, as well as tangible articles of manufacture embodying any combination of the foregoing. Such control logic, when executed by one or more data processing devices (such as the computer system 400), may cause such data processing devices to operate as described herein.

Figure 5:
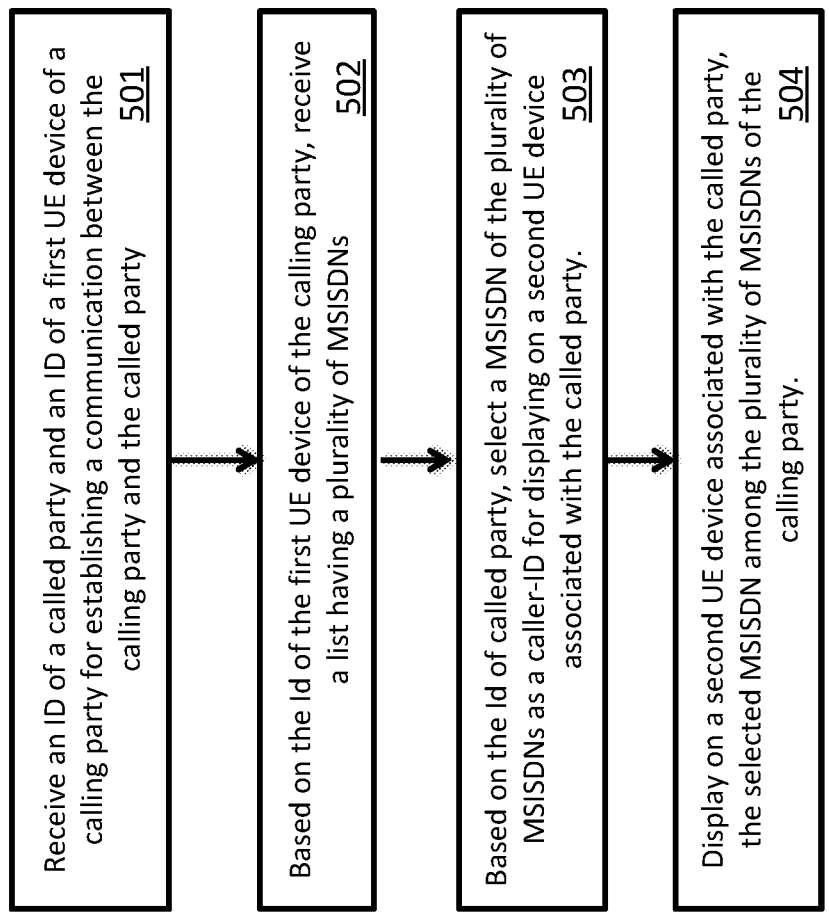
FIG. 5 illustrates a flow chart of a method in accordance with some of the embodiments.

FIG. 5 is a flow chart illustrating an exemplary method 500 in accordance with the emodiments. The method 500 can include the step 501 of receiving an identifier of a called party and an identifier of a first UE device of a calling party for establishing a communication between the calling party and the called party. Based on the identifier of the first UE device of the calling party, the method can receive a list having a plurality of MSISDNs at 502. At step 503 based on the Id of called party, the method 50 can select a MSISDN of the plurality of MSISDNs as a caller-ID for displaying on a second UE device associated with the called party. At step 504, the method 500 can display on a second UE device associated with the called party, the selected MSISDN among the plurality of MSISDNs of the calling party.

Figure 6:
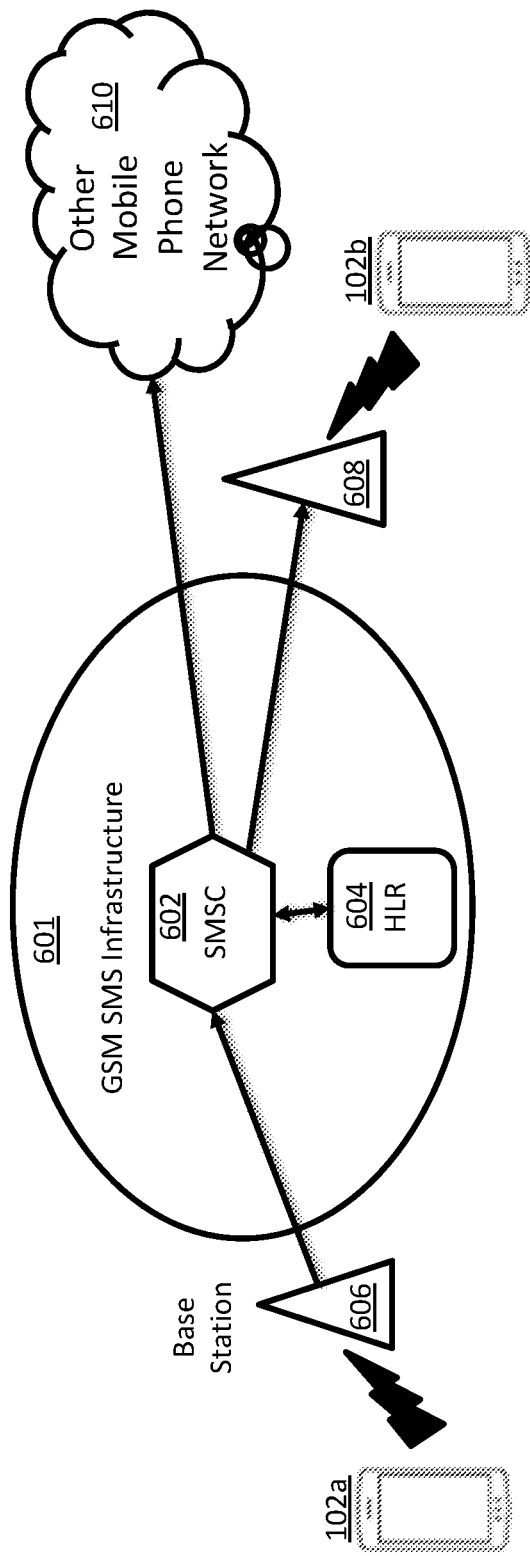
FIG. 6 is block diagram of a network environment using SMS infrastructure in accordance with some of the embodiments.

FIG. 6 illustrates an exemplary communication system 600 including an SMS infrastructure system 601 that can use the method 500 or a similar method to enable the display of a plurality of MSISDNs of a calling party. At its most simple level, SMS infrastructure uses specialized servers that can talk to each other. These servers run software called an SMSC (Short Message Service Centre) 602 which speak to each other using a unique protocol for SMS transmission called SMPP (Short Message Peer to Peer). Through SMPP connections, the system 600 can deliver text messages and process replies and delivery receipts (DLR). SMSCs process DLRs to notify if the status of a text message is delivered. There are many types of delivery receipts used by different carriers.

The SMS infrastructure system can include the SMSC 602 that is coupled to a Home Location Record (HLR) 604 of the overall communication system 600. In the communication system 600, the first user UE device 102a communicates with the second user UE device 102b via the SMS infrastructure system 601 and respective base stations 606 and 608 coupled to the SMSC 602 as shown. The UE device 102a can also send SMS messages to other mobile devices on other mobile networks via base station 606, the SMSC 602, and a mobile phone network 610 as shown. By sending the appropriate message over the SS7 signalling network, it is possible to query the HLR 604 of any mobile subscriber using their phone number. This process is known as performing an "HLR Lookup" or "HLR Query". HLR Lookups are a fast, effective, and accurate way to determine which network operator currently serves a given mobile telephone number. The HLR 604 would hold the most accurate, up-to-date information on the subscriber. HLR lookups are fast and inexpensive to perform and can be performed in real-time during call setups or SMS (or MMS) deliveries.

The SMSC 602 is a combination of hardware and software that can store SMS messages on a FIFO basis. If the destination of the message is within the local network, the HLR 604 is quieried to find the current location of the intended device. The HLR 604 will also inform if the intended device is currently on. If the intended device is off, the the HLR 604 is informed of a message waiting for the intended device. Once the intended device device is turned on, the SMS message will be forward to the location of the intended device. If the intended device is outside the local network, the message will be forward to the SMSC (602) of the local network for the intended device and the SMS delivery process will otherwise function the same.

Figure 7:
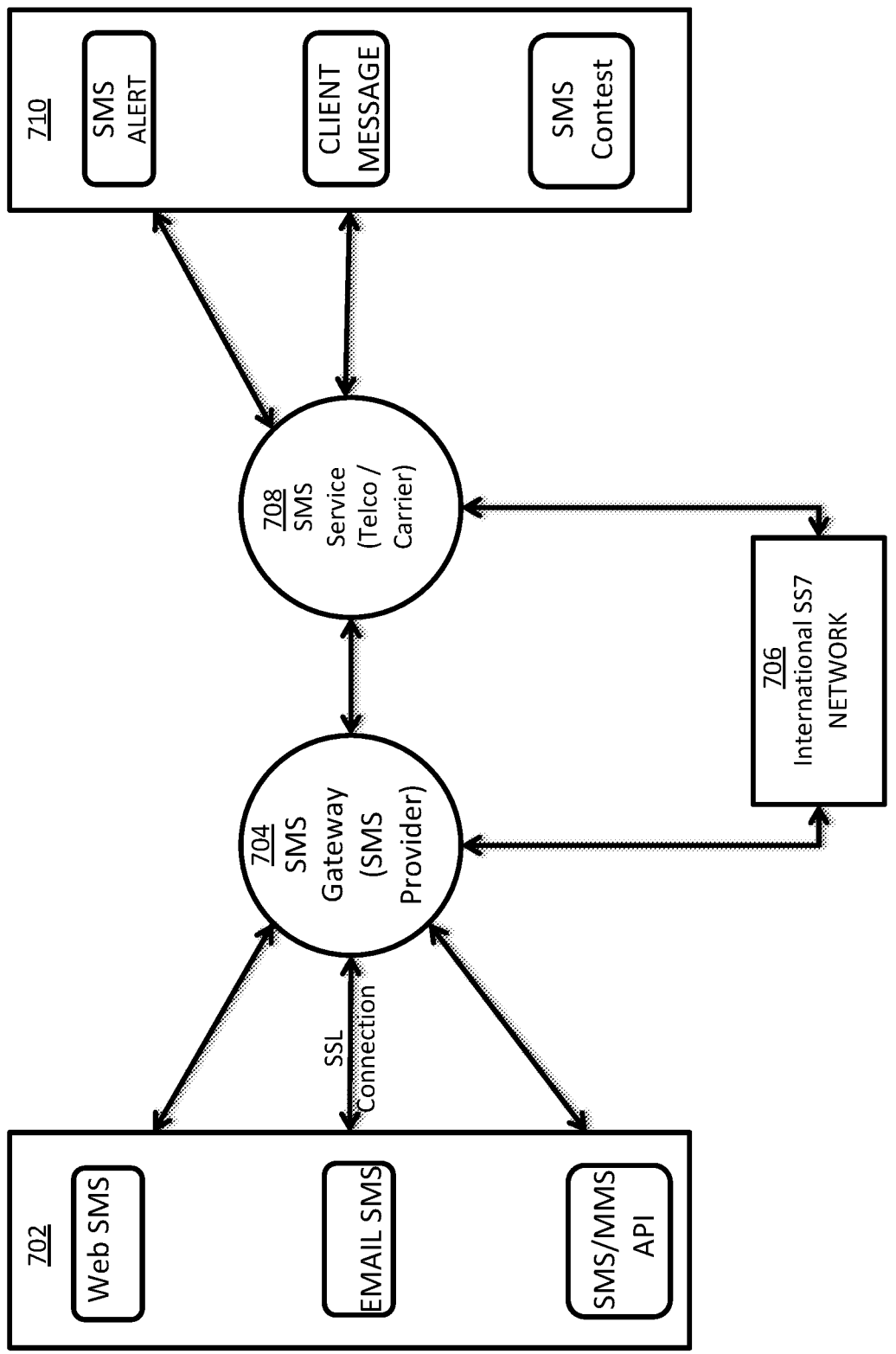
FIG. 7 is another block diagram of a network environment using SMS infrastructure in accordance with some of the embodiments.

Referring to FIG. 7, a block diagram of an SMS system 700 is shown including a client device 702 that can choose from a variety of online SMS services such as Web SMS, Email SMS, or SMS API. Once the client device 702 requests to have text messages sent through one of the services, it can go through a secure SSL connection to an SMS Gateway 704. In some embodiments, the gateway 704 assists in monitoring message compliance, spam, and can schedule large bulk requests to send seamlessly. The SMS then goes through the gateway 704 and gets delivered to a client's carrier connection using the carrier SMS service 708 or through the International SSL Network 706 such as an SS7 network. Once the message is delivered to the recipient or called party client device 710, the client device 710 will have the option to reply via the network shown. This is how the process becomes interconnected.

The SMS gateway 704 is a type of SMSC that moves text messages from one place to another. One example of an SMS is Kannel which is a compact and powerful open source SMS gateway for GSM networks, widely used across the globe for sending trillions of SMS messages daily. Kannel runs on the server to identify destinations, manage queues, and prioritise message transmissions via SMSC.

The SMSC, such as SMSC 602 shown in FIG. 6 can be an element of a GSM network responsible for processing SMS messages. The SMSC stores messages and extracts destination information to attempt deliveries. It is the primary connection point within a carrier or company that sends or receives text messages. With respect to the Network 706, carriers around the world are in a network known as the "SS7" or the "Signalling System #7" network. The SS7 network is what all the carriers use to talk with each other. It helps exchange information for phone calls, number translations, prepaid billing, and it also forms the backbone of SMS. Further note that GSM is a widely used TDMA based wireless network technology. GSM phones use SIM cards to identify each user's account. SIM cards allow GSM network users to quickly move their phone number from one GSM phone to another by simply swapping SIM cards. The GSM network evolved over the years, from CDMA, 3G, 4G, and soon 5G. However, in the SMS business world, such networks are generally referred to as the GSM network, which consists of SIM cards, mobile towers, and all the other hardware that facilitates the delivery of mobile communications to mobile phones. Note however that the embodiments are not limited to GSM networks and other networks (wireless and wired) are contemplated within the scope of the claims and embodiments disclosed.

Figure 8:
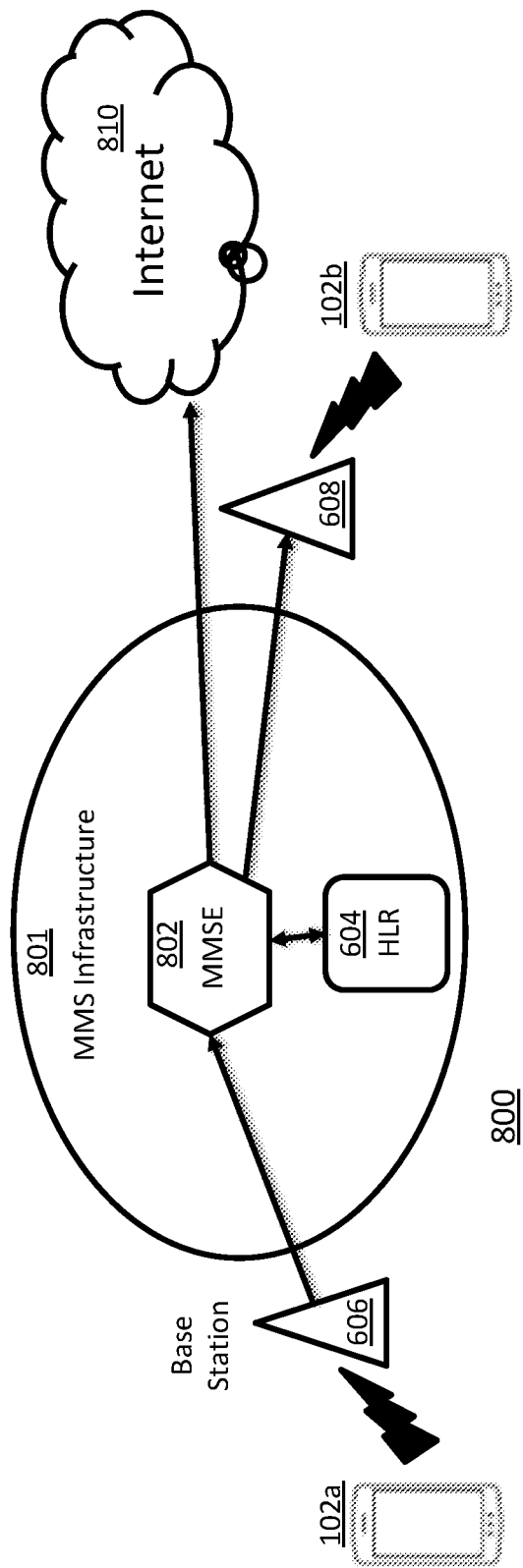
FIG. 8 is a block diagram of a network environment using MMS infrastructure in accordance with some of the embodiments.

FIG. 8 illustrates an exemplary communication system 800 including an MMS infrastructure system 801 that can use the method 500 or a similar method to enable the display of a plurality of MSISDNs of a calling party similar to the system 701 shown in FIG. 7 with respect to a SMS infrastructure. At with SMS, MMS infrastructure uses specialized servers that can talk to each other. These servers run software called an MMSE (MMS Environment) 802 which speak to each other using a protocol for MMS transmission such as the WAP protocol in GSM based networks. The WAP protocol is a transport that provides security to the messages and also access to the Internet to move the MMS message if needed to the Internet. The data format for the media is usually WML, XML, or SMIL (Synchronized Multimedia Integration Language).

The MMS infrastructure system 801 can include the MMSE 802 (that includes an MMSC or MMS Centre similar to a SMSC in system 600) that is coupled to a Home Location Record (HLR) 604 of the overall communication system 800. In the communication system 800, the first user UE device 102a communicates with the second user UE device 802b via the MMS infrastructure system 801 and respective base stations 606 and 608 coupled to the MMSE 802 as shown. The UE device 102a can also send SMS messages or MMS message to other mobile devices (or other communication devices generally) on other networks via base station 606, the MMSE 802, and the internet 810 as shown.

In the absence of any specific clarification related to its express use in a particular context, where the terms "substantial" or "about" in any grammatical form are used as modifiers in the present disclosure and any appended claims (e.g., to modify a structure, a dimension, a measurement, or some other characteristic), it is understood that the characteristic may vary by up to 30 percent. For example, a small cell networking device may be described as being mounted "substantially vertical," In these cases, a device that is mounted exactly vertical is mounted along a "Y" axis and a "X" axis that is normal (i.e., 90 degrees or at right angle) to a plane or line formed by a "Z" axis. Different from the exact precision of the term, "vertical," and the use of "substantially" or "about" to modify the characteristic permits a variance of the particular characteristic by up to 30 percent.

The terms "include" and "comprise" as well as derivatives thereof, in all of their syntactic contexts, are to be construed without limitation in an open, inclusive sense, (e.g. , "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Unless the context requires otherwise, throughout the specification and claims which follow, the word "comprise" and variations thereof, such as, "comprises" and "comprising," are to be construed in an open, inclusive sense, e.g., "including, but not limited to."

Reference throughout this specification to "one embodiment" or "an embodiment" or "some embodiments" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or idea.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

As the context may require in this disclosure, except as the context may dictate otherwise, the singular shall mean the plural and vice versa. All pronouns shall mean and include the person, entity, firm or corporation to which they relate. Also, the masculine shall mean the feminine and vice versa.

When so arranged as described herein, each computing device may be transformed from a generic and unspecific computing device to a combination device comprising hardware and software configured for a specific and particular purpose. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The headings and Abstract of the Disclosure provided herein are for convenience only and do not limit or interpret the scope or meaning of the embodiments. The various embodiments described above can be combined to provide further embodiments. Aspects of the embodiments can be modified, if necessary to employ concepts of the various patents, application and publications to provide yet further embodiments.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

What is claimed:

1. A method, comprising:
   receiving an identification of a called party and an identification of a first user equipment (UE) device of a calling party for establishing a communication between the calling party and the called party;
   based on the identification of the first UE device of the calling party, receiving a list comprising a plurality of MSISDNs;
   based on the identification of the called party, selecting a MSISDN of the plurality of MSISDNs as a caller-id for displaying on a second UE device associated with the called party;
   receiving a message for authenticating the first UE device;
   retrieving a profile corresponding to the first UE device including an international mobile subscriber identity (IMSI) of the first UE device;
   building a response message including a list of MSISDNs associated with the IMSI; and
   sending the response message to a mobile application.

2. The method of claim 1, wherein the communication between the calling party and the called party is a via a voice call.

3. The method of claim 1, wherein the communication between the calling party and the called party is via a short messaging service (SMS).

4. The method of claim 1, wherein the communication between the calling party and the called party is via a multimedia messaging service (MMS).

5. The method of claim 1, wherein the second UE device associated with the called party or an infrastructure device intermediate to the first UE device and the second UE device receives the list comprising the plurality of MSISDNs.

6. The method of claim 1, wherein the first UE device and the second UE device are each one among a personal digital assistant (PDA), desktop workstation, laptop computer, notebook computer, netbook, tablet, smartphone, smartwatch, another type of wearable, appliance, part of an Internet-of-Things device, or an embedded system device.

7. The method of claim 1, wherein the communication between the calling party and the calling party occurs via one or more among a wired network, a wireless network, a combination of a wired and a wireless network, a local area network (LAN), a wide area network (WAN), a Public Switched Telephone Network (PSTN), and/or the Internet.

8. The method of claim 1, wherein the list comprising the plurality of MSISDNs comprise one among a list of a plurality MSISDNs for a single subscriber identity module (SIM), a plurality of MSISDNs for a single mobile device, a plurality of MSISDNs used over multiple international mobile subscriber identities (IMSIs).

9. The method of claim 1, wherein the list comprising the plurality of MSISDNs comprise a list of a plurality MSISDNs for a single subscriber identity module (SIM).

10. The method of claim 1, wherein the method further comprises displaying any of the plurality of MSISDNs for the SIM across a plurality of networks.

11. A communication apparatus, comprising:
    one or more processors;
    one or more memory devices coupled to the one or more processor, wherein the one or more memory devices have stored therein instructions when executed by the one or more processor to cause the communication apparatus to operate by:
    receiving an identification of a called party and an identification of a first user equipment (UE) device of a calling party for establishing a communication between the calling party and the called party;
    based on the identification of the first UE device of the calling party, receiving a list comprising a plurality of MSISDNs;
    based on the identification of the called party, selecting a MSISDN of the plurality of MSISDNs as a caller-id for displaying on a second UE device associated with the called party;
    receiving a message for authenticating the first UE device;
    retrieving a profile corresponding to the first UE device including an international mobile subscriber identity (IMSI) of the first UE device;
    building a response message including a list of MSISDNs associated with the IMSI; and
    sending the response message to a mobile application.

12. The communication apparatus of claim 11, wherein the communication apparatus is the second UE device.

13. The communication apparatus of claim 11, wherein the communication apparatus is one among an application server, an application server at a mobile switching center (MSC), or an application server at an MSC on a random access network (RAN).

14. The communication apparatus of claim 11, wherein the communication apparatus is one or more among an originating mobile switching center and a terminating mobile switching network.

15. The communication apparatus of claim 11, wherein the intructions when executed by the one or more processors further cause the one or more processors to:

parse the received response message; and
display the list of MSISDNs.

16. The communication apparatus of claim 15, wherein the instructions when executed by the one or more processors caus the one or more processors to receive designations for active MSISDNs and inactive MSISDNs.

17. The communication apparatus of claim 11, wherein the list comprising the plurality of MSISDNs comprise one among a list of a plurality MSISDNs for a single subscriber identity module (SIM), a plurality of MSISDNs for a single mobile device, a plurality of MSISDNs used over multiple international mobile subscriber identities (IMSIs).

18. The communication apparatus of claim 11, wherein the communication apparatus is one among a personal digital assistant (PDA), desktop workstation, laptop computer, notebook computer, netbook, tablet, smartphone, smartwatch, another type of wearable, appliance, part of an Internet-of-Things device, an embedded system device, an application server, or a mobile switching center.

19. A system for displaying a plurality of mobile station international subscriber directory numbers (MSISDNs), comprising:
one or more processors;
one or more memory devices coupled to the one or more processor, wherein the one or more memory devices have stored therein instructions when executed by the one or more processor to cause the communication apparatus to operate by:
receiving an identification of a called party and an identification of a first user equipment (UE) device of a calling party for establishing a communication between the calling party and the called party;
based on the identification of the first UE device of the calling party, receiving a list comprising a plurality of MSISDNs;
based on the identification of the called party, selecting a MSISDN of the plurality of MSISDNs as a caller-id for displaying on a second UE device associated with the called party;
receiving a message for authenticating the first UE device;
retrieving a profile corresponding to the first UE device including an international mobile subscriber identity (IMSI) of the first UE device;
building a response message including a list of MSISDNs associated with the IMSI; and
sending the response message to a mobile application.

* * * * *